(12) United States Patent
Theis

(10) Patent No.: US 7,827,782 B2
(45) Date of Patent: Nov. 9, 2010

(54) METHOD FOR REMEDIATING EMISSIONS

(75) Inventor: Joseph Theis, Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 835 days.

(21) Appl. No.: 11/277,285

(22) Filed: Mar. 23, 2006

(65) Prior Publication Data

US 2006/0260296 A1 Nov. 23, 2006

Related U.S. Application Data

(60) Provisional application No. 60/682,533, filed on May 19, 2005.

(51) Int. Cl.
*F01N 3/00* (2006.01)
(52) U.S. Cl. ............... 60/286; 60/274; 60/295; 60/296; 60/297; 60/303
(58) Field of Classification Search ............ 60/274, 60/286, 287, 295, 296, 297, 301, 303, 323, 60/324; 422/170, 172, 177, 182, 183
See application file for complete search history.

(56) References Cited

U.S. PATENT DOCUMENTS

| 6,182,443 | B1 | 2/2001 | Jarvis et al. | |
| 6,314,722 | B1 * | 11/2001 | Matros et al. | 60/274 |
| 6,354,079 | B1 * | 3/2002 | Choi et al. | 60/286 |
| 6,625,975 | B1 | 9/2003 | Stahl et al. | |
| 6,725,647 | B2 | 4/2004 | Pfeifer et al. | |
| 6,973,776 | B2 * | 12/2005 | van Nieuwstadt et al. | 60/286 |
| 7,117,669 | B2 * | 10/2006 | Kaboord et al. | 60/288 |
| 7,213,395 | B2 * | 5/2007 | Hu et al. | 60/286 |
| 2002/0116920 | A1 | 8/2002 | Pfeifer et al. | |
| 2004/0076565 | A1 | 4/2004 | Gandhi et al. | |
| 2004/0096383 | A1 | 5/2004 | Montreuil et al. | |
| 2007/0130915 | A1 * | 6/2007 | Beckmann et al. | 60/285 |

* cited by examiner

*Primary Examiner*—Tu M Nguyen
(74) *Attorney, Agent, or Firm*—Damian Porcari; Brooks Kushman P.C.

(57) ABSTRACT

A method for remediating an emission containing NOx emissions includes introducing an exotherm generating agent into the NOx emissions when the inlet temperature of the NOx emissions is in a range of 300° C. to 600° C. and an air/fuel ratio is greater than or equal to 15; exposing the NOx emissions to a lean NOx trap; introducing a reducing agent into the emissions when the inlet temperature of the emissions is greater than 130° C. and less than 600° C.; exposing the NOx emissions having an air/fuel ratio greater than or equal to 15 to a selective catalytic reduction catalyst; and producing a remediated emission having an air/fuel ratio greater than or equal to 15.

16 Claims, 4 Drawing Sheets

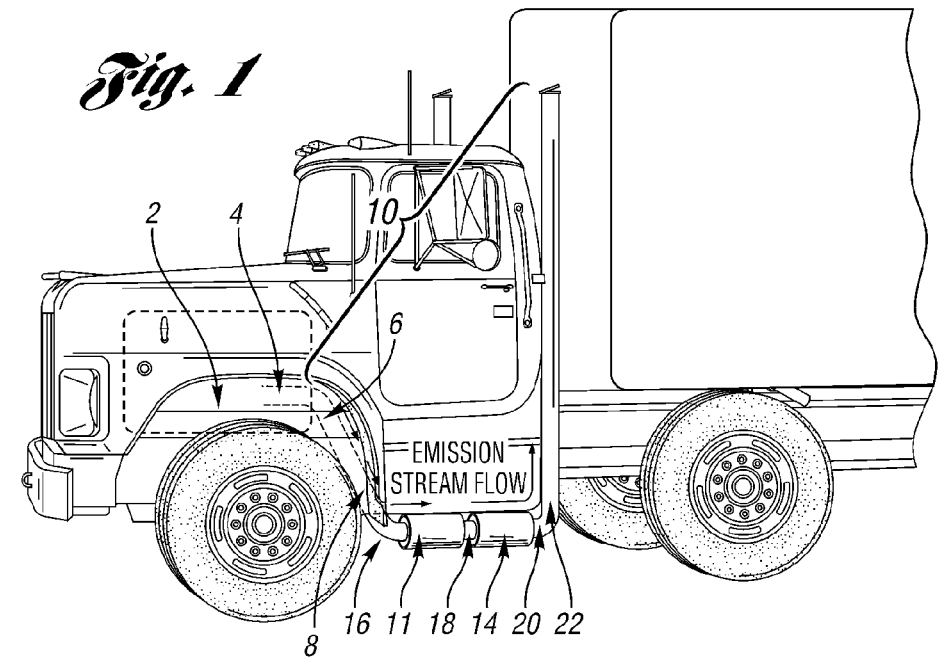
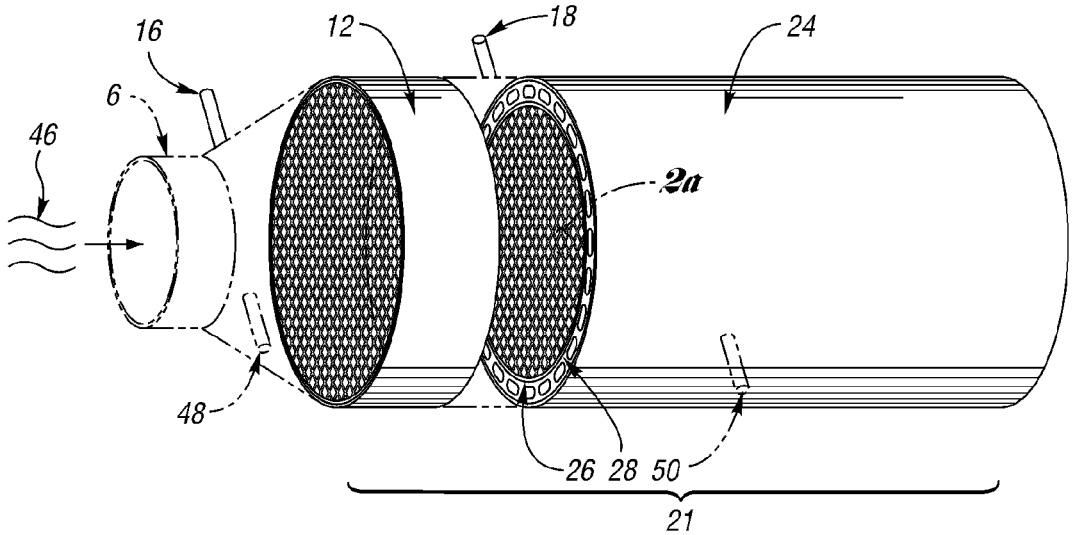
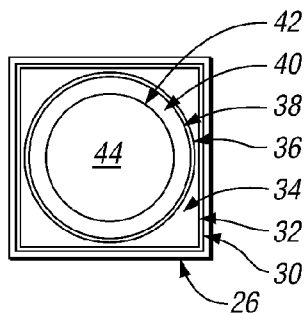

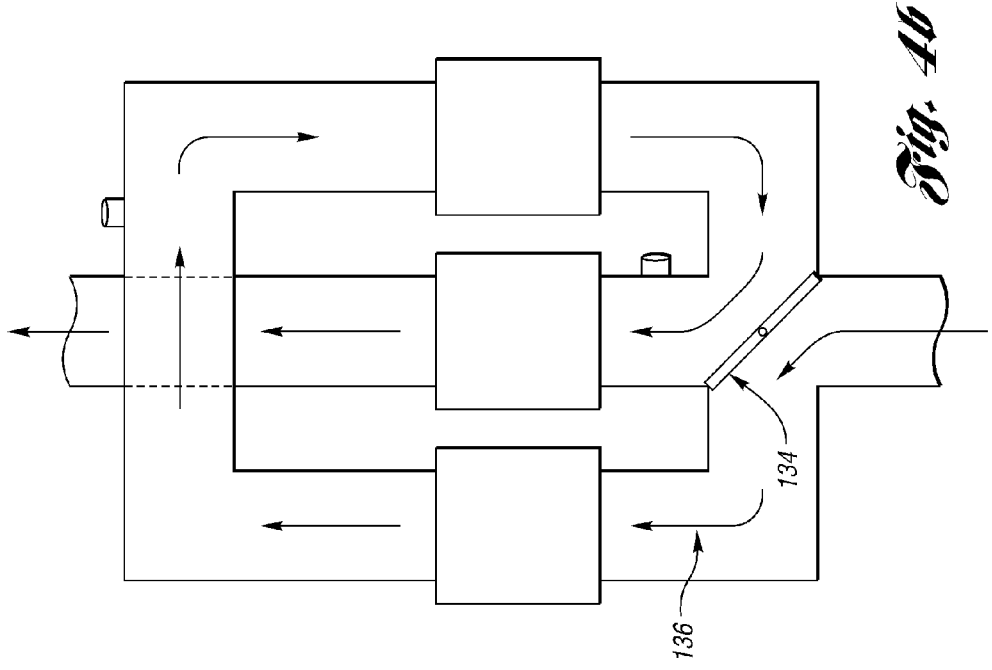
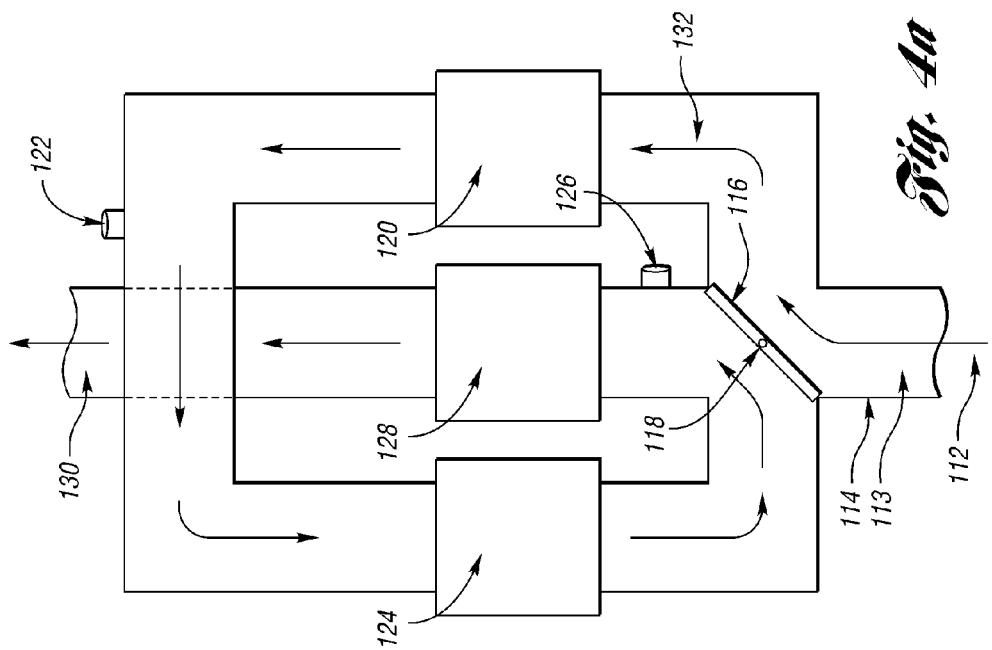

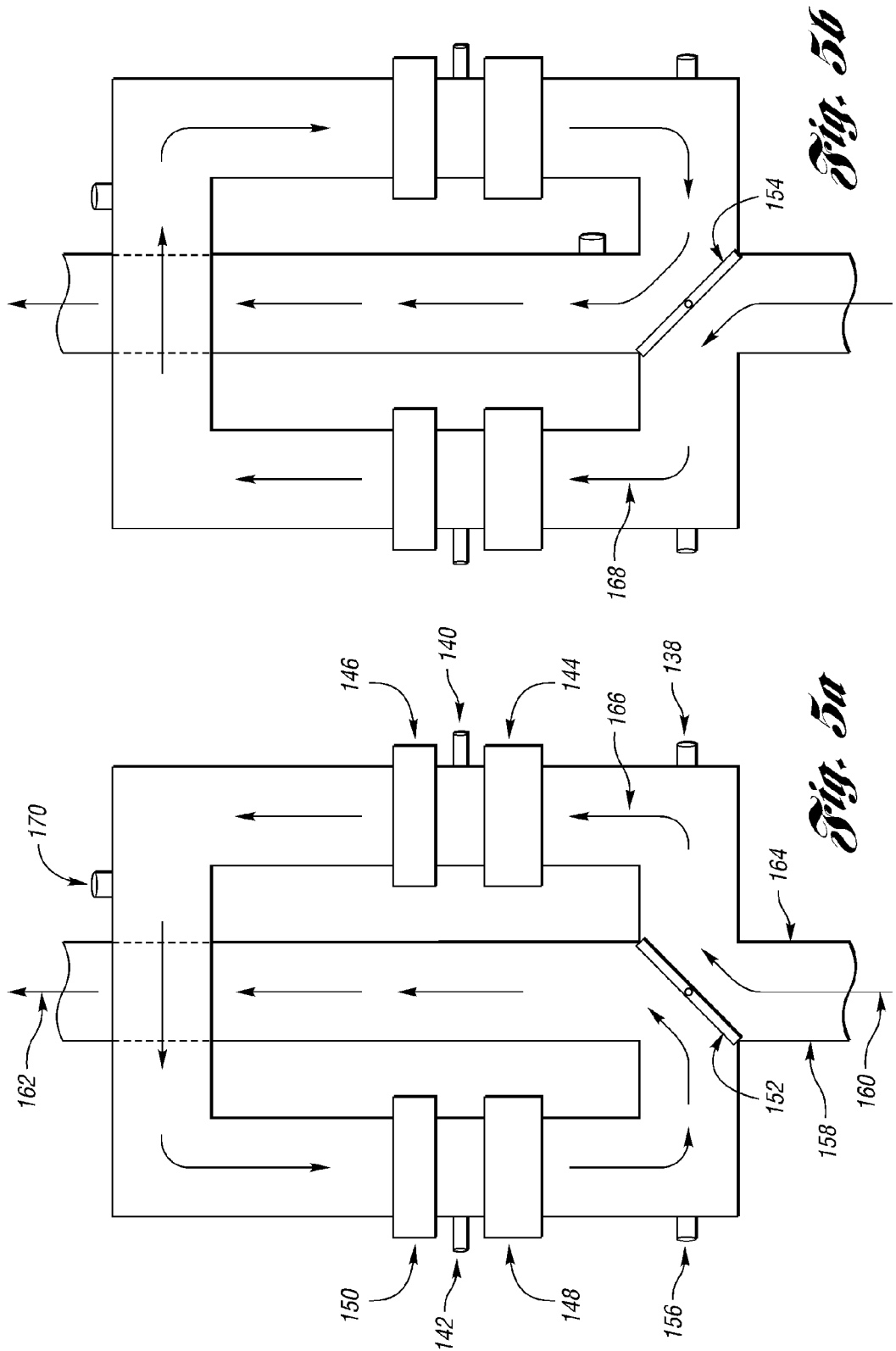

METHOD FOR REMEDIATING EMISSIONS

CROSS-REFERENCE TO RELATED APPLICATION

This application claims the benefit of U.S. Provisional Application Ser. No. 60/682,533, filed May 19, 2005.

BACKGROUND OF THE INVENTION

1. Field of the Invention

One aspect of the present invention relates to a method for remediating emissions.

2. Background Art

Environmental regulations regarding emissions from engines and electrical generation stations are in effect in many countries. Among the emissions of regulatory concern are oxides of nitrogen. The oxides of nitrogen include, but are not limited to, nitric oxide, NO, and nitrogen dioxide, $NO_2$. These compounds are frequently referred to as NOx as prescribed by the United States Environmental Protection Agency.

NOx emissions in an emissions stream may occur under lean burn conditions of a diesel engine. In an exhaust system of the diesel engine of a heavy truck, controlling NOx emissions may be a significant challenge due to rapidly changing temperatures and chemical composition of the emissions. Such changes may arise during a rapid acceleration or deceleration of the heavy truck. In such scenario, an inlet emissions temperature of the emissions may change relatively quickly from as low as 130° C. to as high as 600° C. and an air-to-fuel (A/F) ratio of the emissions stream may change relatively quickly from as low as 15 to as high as 100.

Aftertreatment systems have been proposed to remediate NOx in the emissions from a diesel engine. These systems suffer from one or more disadvantages. For example, a lean NOx trap may have difficulty providing relatively good NOx storage capacity at relatively low temperatures of the emissions. By contrast, some lean NOx traps may provide effective NOx remediation techniques for engines with lean exhaust when the inlet emissions temperature is predominantly above 300° C. However, the lean NOx trap may reach capacity with regards to its ability to trap NOx. Restoring the trapping capacity of the lean NOx trap may involve purging. Purging the lean NOx trap may involve providing a fuel-rich emission. Providing the fuel-rich emissions throughout the entire diesel engine and exhaust system may waste expensive fuel.

Another challenge in remediating NOx in diesel systems is matching the concentration of supplied reducing agent to the concentration of NOx in the emissions during transient operations. During transient operations, such as acceleration and deceleration, the exhaust flow rates, temperature of the emissions, and NOx concentrations can change rapidly. Rapid changes in some cases may be controlled by a selective catalytic reduction (SCR) catalyst. The SCR can store $NH_3$, particularly at relatively low temperatures of the emissions. However, at temperatures of 450° C. and above, the SCR effectiveness for controlling NOx emissions in the emissions stream may decrease because the amount of ammonia which the SCR catalyst can store drops to a relatively low level.

In light of the foregoing, what is needed is an effective emissions remediation method for NOx emissions suitable for lean air-to-fuel ratio conditions for a relatively wide range of temperature and NOx concentrations in the emissions.

What is further needed is an emissions remediation method for NOx emissions that avoids wasting expensive fuel.

SUMMARY OF THE INVENTION

One aspect of the present invention is a method for remediating NOx emissions in an emission stream. In at least one embodiment, the method includes introducing an exotherm generating agent into the emissions stream containing NOx emissions when an inlet temperature of the emissions is in a range of 300° C. to 600° C.; exposing the emissions to a lean NOx trap; introducing a reducing agent into the emissions when the inlet emissions temperature is in a range of 130° C. to 600° C. and has an air/fuel ratio greater than or equal to 15; exposing the emissions having an air/fuel ratio greater than or equal to 15 to a selective catalytic reduction catalyst; and, producing a remediated emission having an air/fuel ratio greater than or equal to 15.

In certain embodiments, the method includes introducing the exotherm generating agent intermittently.

In at least one embodiment, a method for integrating the selective catalytic reduction catalyst and the lean NOx trap (LNT) is described. The method includes applying the lean NOx trap to a substrate. The SCR is applied and is supported by the substrate.

In at least one embodiment, an integrated selective catalytic reduction catalyst and lean NOx trap (SCR/LNT) system is described. The SCR/LNT includes the substrate, the lean NOx trap, and the SCR. The lean NOx trap and the SCR are supported by the substrate.

In at least one embodiment, a method for remediating an emission containing NOx emissions using a selective catalytic reduction catalyst and lean NOx traps is described. The method includes exposing an emission stream to a first lean NOx trap; introducing a exotherm generating agent to the emission stream downstream of the first LNT; exposing the emission stream to a second LNT; introducing a reducing agent to the emission stream downstream of the second LNT; and exposing the emission stream having an air/fuel ratio greater than or equal to 15 to a first SCR; and, producing a remediated emission having an air/fuel ratio greater than or equal to 15.

BRIEF DESCRIPTION OF THE FIGURES

FIG. 1 shows an emissions remediation system according to certain embodiments of the present invention;

FIGS. 2 and 2a show a lean NOx trap plus a layered SCR/LNT system according to certain embodiments of the present invention;

FIGS. 4a and 4b show an emissions remediation system according to certain embodiments of the present invention; and, FIGS. 5a and 5b show another emissions remediation system according to certain embodiments of the present invention.

DETAILED DESCRIPTION OF EMBODIMENTS OF THE PRESENT INVENTION

Figure 3:
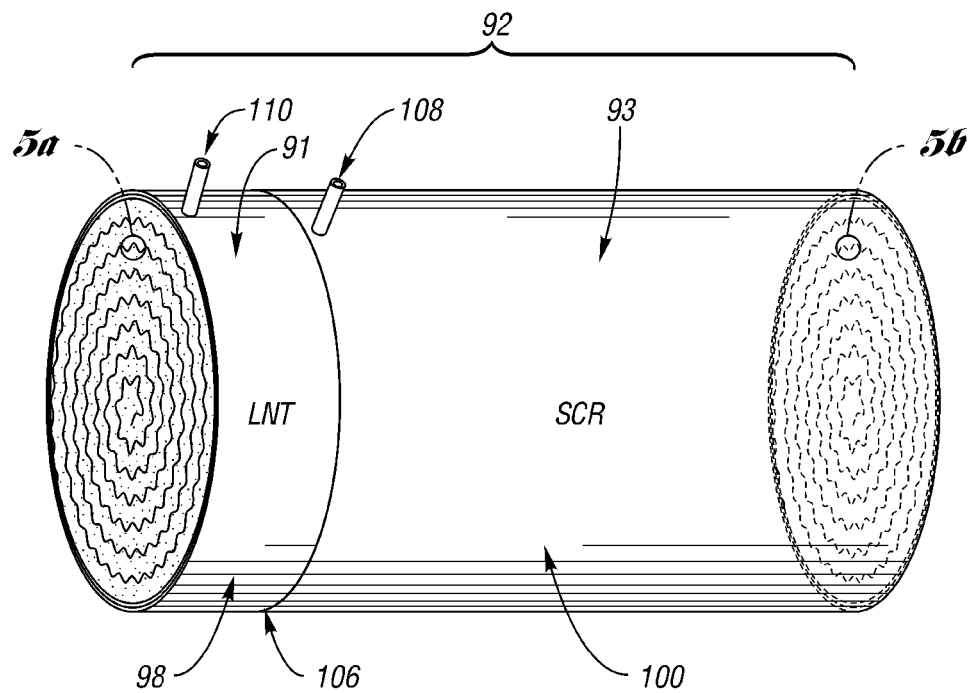
FIGS. 3, 3a, and 3b show a zoned SCR/LNT system according to certain embodiments of the present invention.

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention. Practice within the numerical limits stated should be desired and independently embodied.

The description of a group or class of materials as suitable for a given purpose in connection with the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

At least one embodiment of the present invention is a method for remediating an emissions stream containing NOx emissions by using a first lean NOx trap and a layered SCR/LNT.

Referring to FIG. 1, which describes an overall exemplary environment, the emissions stream 46 (FIG. 2) is produced by an engine 2 and flows out of the engine through an emissions inlet 4. In some embodiments, the emissions inlet 4 is defined by a casing 6. The emissions inlet 4 may be considered as positioned on the upstream side 8 of the remediation system 10. A noble metal containing member 11 is positioned upstream of a SCR/LNT 14. An exotherm generating agent may be introduced through a first introduction port 16. A reducing agent may be introduced through a second introduction port 18. The introduction ports may pass through, be attached to, or be supported by the casing 6. In some embodiments, the casing 6 may continue beyond the SCR/LNT 14 to an emissions outlet 20 located downstream 22 of the SCR/LNT 14.

Referring to FIGS. 2 and 2a, in one embodiment of the present invention the exotherm generating agent introduction port 16 and the reducing agent introduction port 18 are attached to the casing 6. The exotherm generating agent introduction port 16 is positioned upstream of an LNT 12 portion which precedes the portion having a layered SCR/LNT 24. This forms a zoned LNT plus a layered SCR/LNT system 21. The reducing agent introduction port 18 is positioned between the first LNT 12 portion and the portion having the layered SCR/LNT 24. A substrate 26 may be connected to the casing 6 by a compression-fit web 28. The layered SCR/LNT 24 may be applied to the substrate 26. The substrate 26 has a fifth opposing surface 30 adjacent to some portions of a fourth opposing surface 32 of an LNT layer 34. The LNT layer 34 has a third opposing surface 36 adjacent in some portions to a second opposing surface 38 of an SCR layer 40. The SCR layer 40 also has a first opposing surface 42 which is adjacent to the open space 44 defined, in part, by the SCR layer 40. An emissions stream 46 containing NOx emissions is exposed to the SCR layer 40 as the emissions 46 flow through the space 44. An inlet emissions temperature probe 48 is optionally present in the emissions 46 upstream of the layered SCR/LNT 24. An optional bed temperature probe 50 is present in a portion of the layered SCR/LNT 24. It should be understood that temperature may be also signaled by other methods. A non-limiting example of such is a model-based calculation based on engine activity.

In this embodiment of the present invention the method for remediation may include the introduction of the exotherm generating agent to the emissions 46 and exposure of the emissions 46 to the noble metal containing member 11 (FIG. 1). The noble metal containing member 11 may include the first lean NOx trap 12, a lightoff catalyst, a three-way catalyst, a bimetallic catalyst, a noble metal catalyst, or combinations thereof. The introduction of exotherm generating agent in such a manner may allow saving of expensive fuel since the remediation system 10 (FIG. 1) remains substantially lean regarding A/F ratio. The method may also include introduction of the reducing agent to the emissions 46 that subsequently interacts with the SCR layer 40.

In certain embodiments of the present invention, the reducing agent may be introduced into the emissions stream 46 between the LNT 12 and the SCR 24 when the emissions inlet temperature of the emission stream 46 upstream of the LNT 12 is in the range of 130° C. to 600° C. This introduction may overlap introducing the exotherm generating agent into the emissions stream 46 before the LNT 12 when the inlet temperature of the emissions 46 is the range of 300° C. to 600° C. The A/F ratio downstream of the SCR 24 remains greater than or equal to 15 before, during, and after the time period when the exotherm generating agent and reducing agent are introduced. These introductions may relatively improve the remediation of the emissions stream containing NOx emissions when exposing the emissions to the SCR/LNT.

Figure 3A:
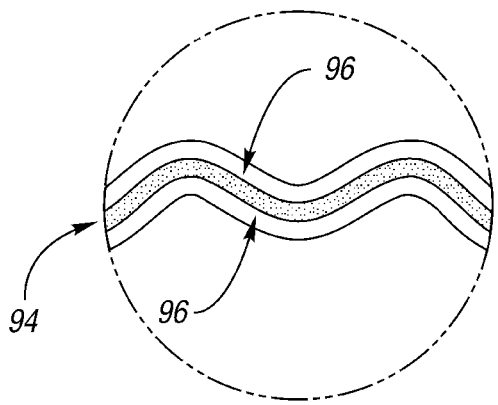
Figure 3B:
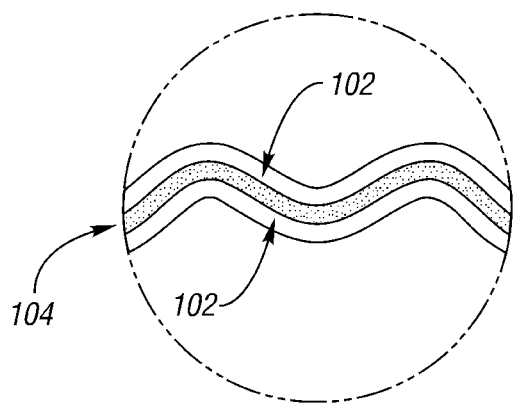

In another embodiment of the present invention, a zoned SCR/LNT may include an LNT on a separate substrate upstream relative to an SCR. Referring to FIGS. 3, 3a, and 3b, the LNT 91 is formed when an LNT layer 96 is washcoated on to a carbide-whiskered, first stainless steel metal foil substrate 94 which is confined by a first stainless steel case 98. The SCR 93 is formed when a second stainless steel metal foil substrate 104 is washcoated with an SCR layer 102. The second stainless steel metal foil is contained in a second stainless steel case 100. The LNT 91 is welded to the upstream side of the SCR 93 at a weld 106. The reducing agent introduction port 108 is positioned near the weld 106 upstream of the SCR 93 and downstream of the LNT 91. The exotherm generating agent introduction port 110 is positioned upstream of the LNT 91. It should be understood that a cavity may optionally exist between the downstream end of the LNT 91 and the upstream end of the SCR 93. The reducing agent introduction port 108 may be positioned in such a cavity to allow effective blending of the emissions stream 46 and the reducing agent.

In certain embodiments, the remediation system 10 (FIG. 1) may be viewed as a kit where the emissions 46 (FIG. 2) are streaming into an emissions inlet 4 which is defined by the casing 6. The casing may include a compression-fitting web 28 adjacent to the substrate 26, and which in certain embodiments may include components of the exhaust train from the engine manifold to the muffler. The casing 6 assists in directing the emissions 46 to portions where catalytic and trapping action occur. The casing 6 also directs the emissions 46 to an emissions outlet 20 which is positioned downstream 22 of the SCR/LNT 14. Non-limiting examples of such portions where catalytic and trapping actions occur may include a noble metal containing member 11 (FIG. 1) such as the lightoff catalyst, the first lean NOx trap 12 (FIG. 2); and/or the LNT portion 98 (FIG. 3) of the SCR/LNT 92. The lightoff catalyst may include a noble metal, a bimetallic or a three-way catalyst.

In certain embodiments of the present invention, the remediation occurs under essentially assured lean emissions conditions. The A/F ratio averaged over the remediation system 10 (FIG. 1) could be greater than 15, 20, 25, 30, 35, or 40, and less than 100, 90, 80, 70, 60, or 50, with the range selected independently from these values.

In certain embodiments of the present invention, introduction of the reducing agent can expose the selective catalytic reduction catalyst, either as the SCR layer 40 (FIG. 2) of the SCR/LNT 24; or the SCR 93 (FIG. 3) portion of the zoned SCR/LNT 92, to the reducing agent. Non-limiting examples of reducing agents may include ammonia, ammonium compounds, hydrazine, urea, or combinations thereof.

In certain embodiments of the present invention, the exotherm generating agent may be introduced to the emissions 46 (FIG. 2). The introduction of the exotherm generating agent can expose the lean NOx trap either as a first LNT 12 (FIG. 2) portion; or LNT 91 (FIG. 3) portion of the zoned SCR/LNT 92. Non-limiting examples of the exotherm generating agents may include fuel; emissions exhaust, such as exhaust gas recirculation (EGR); or combinations thereof. Non-limiting examples of fuel may include hydrocarbons, aliphatic compounds, cycloaliphatic compounds, aromatic compounds, alkanes, gasoline, alcohols, propane, biofuels, biodiesel, diesel fuel, propylene, petroleum distillates, liquefied petroleum gas, natural gas, or combinations thereof.

Operating costs may be relatively reduced when the exotherm generating agent is introduced only intermittently to the LNT such as at times when the LNT approaches a fraction of storage capacity used. This fraction may be greater than 10%, 20%, 30%, 40%, 50%, 60%, 70%, 80%, or 90% of the storage capacity available. Exceeding the fraction of storage capacity may trigger a regeneration signal. The regeneration signal may cause the introduction of the exotherm generating agent. Non-limiting examples of means to trigger a regeneration signal for the introduction of the exotherm generating agent include a timer; a NOx sensor, such as a chemiluminescent detector or an electrochemical sensor; a signal from a model-based calculation of the engine output and the amount of NOx stored; or combinations thereof.

In certain embodiments of the present invention, non-limiting examples of the SCR layer 40 (FIG. 2) of the SCR/LNT 24; or the SCR 93 (FIG. 3) portion of the zoned SCR/LNT 92 may include one or more of the following compounds: a silica, an alumina, a hydrated alumina compound, an activated alumina compound, a mullite, a cordierite, a steatite, a clay, or combinations thereof, and one or more compounds chosen from a lanthanide metal compound, a transition metal compound, or combinations thereof.

In certain embodiments of the present invention, non-limiting examples of the lean NOx trap layer 34 (FIG. 2); the first LNT 12 portion (FIG. 2); or the LNT 91 (FIG. 3) portion of the zoned SCR/LNT 92 may include of one or more of the following compounds: an alkali metal compound, an alkali-earth metal compound, silica, alumina, hydrated alumina compounds, activated alumina compounds, mullite, cordierite, steatite, clay, or combinations thereof; and one or more of the following compounds: a catalytic component such as a noble metal compound; lanthanide metal compounds; transition metal compounds; or combinations thereof.

Non-limiting examples of the substrate 26 (FIG. 2) used in certain embodiments include a particulate trap, a wire mesh, a whiskered non-corroding metal, a coated metal foil, a cordierite substrate, an aluminum titanate substrate, a mullite substrate, a kyanite substrate, an aluminosiloxane substrate, a magnesium aluminum silicate substrate, a refractory ceramic substrate, a ceramic substrate, a technical ceramic substrate, a honeycombed wall-flow monolith having alternating ends open and closed, a honeycombed ceramic monolith having both ends open, a ceramic foam, a zirconia substrate, a silica substrate, a silicon carbide substrate, or a zeolite.

The formulations of the SCR/LNT may vary with the emissions to which they could be exposed. As a non-limiting example, formulations can have metal compound additives to mitigate sulfur compounds. Sulfur compounds in emissions may poison or diminish the catalytic and/or trapping activity. Non-limiting examples of emissions to which the SCR/LNT may be exposed include those which may emanate from combustion processes such as found in a diesel truck; a gasoline powered vehicle; a portable hydrocarbon-powered device, such as a generator, a lawn mower, a snow mobile, a chain saw, as well as a one-, two-, or four-cycle engine; an electric power generation plant; a gas turbine; an airplane; a locomotive; a boat; a personal watercraft; and a ship. Emissions 46 (FIG. 2) can arise from a hybrid power system such as a vehicle intermittently using a combustion process with other power sources such as electricity, liquefied petroleum gas, natural gas, fuel cells, and solar power.

Referring to FIGS. 4a and 4b, a remediation system 114 is illustrated showing an embodiment of the positioning of various components of the system. The remediation system 114 of this illustration may take the following actions when the emissions inlet temperature is greater than 400° C. In this illustration, the casing 113 supports a first LNT 120, a second LNT 124, and an SCR 128. Also, supported by the casing 113 are a first port 122 for introducing an exotherm generating agent and a second port 126 for introducing a reducing agent. An emissions stream 112 flows into the casing 113 and is directed to a channel 132 by a valve 116 on a pivot 118. The first LNT 120 is exposed to the emissions stream 112. Downstream of the first LNT 120, an exotherm generating agent is introduced to the emissions stream 112 at the first port 122. The exotherm generating agent may be introduced for an exotherm generating agent introduction period that may be independently selected from a range consisting of from 0.5, 1, 2, 3, 4, and 5 seconds to 7, 8, 9, 10, 12, 15, 20, 30, 40, 50, and 60 seconds. In certain embodiments, this introduction period may correspond to a second time segment associated with a remediation sequence, such as in Examples 9 and 10. The exotherm introduction period may be delayed after the switching of the valve 116 by an exotherm generating agent introduction delay period that may be independently selected from a range consisting of from 0, 1, 2, 3, 4, 5, and 6 seconds to 7, 8, 9, 10, 12, 15, 20, and 30 seconds. In certain embodiments, this introduction period may correspond to a first time segment associated with the remediation sequence, such as in Examples 9 and 10. The A/F ratio of the emissions stream 112 is greater than or equal to 15 during the exotherm generating agent introduction period. It should be understood that the A/F ratio values do not consider any particular relatively localized A/F ratio, but rather describe a vicinity average. The emissions stream 112 including the exotherm generating agent is exposed to the second LNT 124. The exotherm generating agent generates heat at the second LNT 124. If NOx has been trapped on the second LNT 124, it should be purged by the heat. Downstream of the second LNT 124, the reducing agent is introduced at the second port 126. The emission 112 is exposed to the SCR 128. At the SCR 128 the remainder of the NOx is remediated. The SCR 128 may be comprised of a zoned SCR. It should be understood that SCR 128 could be a layered SCR/LNT or a combination zoned and layered, but purging efficiency may be reduced if sufficient heating cannot be provided by convection even when augmented with other heating elements such as electrical heating. The emission 112 exits at the emissions outlet 130.

In certain embodiments, after a first switching period, the range of which may be independently selected from at least 10, 20, 30, 40, or 50 seconds to at least 60, 70, 80, 90, 100, 150, 200, or 300 seconds, the valve 116 is pivoted on pivot 118 to a channel-directed position 134, and the emissions cease entering the channel 132, and commence entering the channel 136. This switch starts the second switching period. The second LNT 124 is exposed to the emissions stream 112. Downstream of the second LNT 124, an exotherm generating agent is introduced to the emissions stream 112 at the first port 122 while maintaining the air to fuel ratio at greater than or equal to 15. The emissions stream 112 including the exotherm generating agent is exposed to the first LNT 120. The exotherm generating agent generates heat at the first LNT 120. If NOx has been trapped on the first LNT 120, it may be released by the heat. Downstream of the first LNT 120, the reducing agent is introduced at the second port 126. The emission 112 is exposed to the SCR 128. At the SCR 128 the remainder of the NOx may be remediated.

While the second LNT 124 is exposed to the emission 112, the exotherm, which is caused by exposing the first LNT 120 to the exotherm generating agent, is purging the first LNT 120. The purging continues during the second switching period. The second switching period, the range of which may be independently selected from at least 10, 20, 30, 40, or 50 seconds to at least 70, 80, 90, 100, 150, 200, or 300 seconds, ends when the valve 116 is switched back from the position 134 to the position shown in FIG. 4a.

The valve 116 maybe any type of emission diverting device. Non-limiting examples include a four-way valve, an electronically-controlled valve, a baffle, or combinations thereof.

In certain embodiments when a four-way valve is used, a remediation sequence described below may be used. A non-limiting example of the remediation sequence may start with the first time segment having a duration independently selected from 1,3,5, or 7 seconds to 8,10,12, 15, 20, and 30 seconds. During the first time segment, the reducing agent introduction may precondition the SCR 128. The end of the first time segment, the second time segment begins allowing the introduction of both the exothermic generating agent and reducing agent. The second time segment may have a duration independently selected from 1,3,5, or 7 seconds to 8,10, 12, 15, 20, and 30 seconds. After the end of the second time segment, a third time segment begins and has a duration of independently selected from 1,3,5, or 7 seconds to 8,10,12, 15, 20, and 30 seconds during which only the reducing agent is introduced. While not wishing to be bound by any particular theory, this may help to reduce the bleeding of NOx from the downstream end of the NOx trap. After the end of the third time segment, a fourth time segment begins. During the fourth time segment, neither reducing agent nor exotherm generating agent are introduced. The fourth time segment may have a duration independently selected from 15, 20, 25, 30 or 34 seconds to 35,40,50,60, 100, and 297 seconds. A total cycle time of the remediation actions described above for certain embodiments of the present invention may comprise the switch period. The length of time periods may vary depending upon the types of SCR and LNT used as well as the engine mathematical models based on the actual engine and emission conditions.

In certain embodiments of the present invention, during periods when the emission temperature is less than 400° C., introduction of the exotherm generating agent at the first port 122 may cease and the valve 116 will direct emissions into the channel 132 or channel 136 without switching.

Referring to FIGS. 5a and 5b, a remediation system 158 is illustrated. As a non-limiting illustration, the remediation system 158 may involve the following actions when the emissions inlet temperature is greater than 400° C. In this illustration, the casing 164 supports a first LNT 146, a second LNT 150, a first SCR 144, and a second SCR 148. Also, supported by the casing 164 are a first port 170 for introducing an exotherm generating agent, a second port 140 for introducing a reducing agent for a channel 166, a third port 142 for introducing a reducing agent for a channel 168, and a low emission temperature reducing agent port 138. Further, as a non-limiting example, the reducing agent may optionally be introduced at the low emission temperature reducing agent port 138 with a continuous, semi-continuous, pulsed, or intermittent period when the emissions inlet temperature is less than 400° C.

As a non-limiting example, the remediation system 158 may involve the following actions when the emissions inlet temperature is greater than 400° C. In this example, an emissions stream 160 flows into the casing 164 and is directed to the channel 166 by a valve 152. The first SCR 144 is exposed to the emissions stream 160. Downstream of the first SCR 144, the first LNT 146 is exposed to the emissions stream 160. Downstream of the first LNT 146, an exotherm generating agent is introduced to the emissions stream 160 at the first port 170. The emissions stream 160, which includes the exotherm generating agent, is exposed to the second LNT 150. The exotherm generating agent generates heat at the second LNT 150. If NOx has been trapped on the second LNT 150, it is purged by the heat. Downstream of the second LNT 150, the reducing agent is introduced at the third port 142. The emissions stream 160 is exposed to the second SCR 148. At the second SCR 148 the remainder of the NOx is remediated. The second SCR 148 may be comprised of a zoned SCR, a layered SCR/LNT, or a combination thereof. The emissions stream 160 exits at the emissions outlet 162.

In certain embodiments of the present invention, after the first switching period, the range of which may be independently selected from at least 10, 20, 30, 40, or 50 seconds to at least 70, 80, 90, 100, 150, 200, or 300 seconds, the valve 152 is switched to the position 154, and the emissions cease entering the channel 166, and commence entering the channel 168. This switch starts the second switching period. The second SCR 148 is exposed to the emissions stream 160. Downstream of the second SCR 148, the second LNT 150 is exposed to the emissions stream 160. Downstream of the second LNT 146, an exotherm generating agent is introduced to the emissions stream 160 at the first port 170. The emissions stream 160 including the exotherm generating agent is exposed to the first LNT 146. The exotherm generating agent generates heat at the first LNT 146. If NOx has been trapped on the first LNT 146, it is purged by the heat. Downstream of the first LNT 146, the reducing agent is introduced at the second port 140. The emissions stream 160 is exposed to the first SCR 144. At the first SCR 144 the remainder of the NOx is remediated. The first SCR 144 may be comprised of a zoned SCR, a layered SCR/LNT, or a combination thereof. The emissions stream 160 exits at the emissions outlet 162.

While the second LNT 150 is exposed to emissions stream 160, the exotherm, which is caused by exposing the first LNT 146 to the exotherm generating agent, is purging the first LNT 146. The purging continues during the second switching period. In certain embodiments, the second switching period, the range of which may be independently selected from at least 10, 20, 30, 40, or 50 seconds to at least 70, 80, 90, 100, 150, 200, or 300 seconds, ends when the valve 152 is switched back from the position 154 to the position shown in FIG. 5*a*.

In certain embodiments of the present invention, during periods when the emission temperature is less than 400° C., introduction of the exotherm generating agent at the first port 170 may cease and the valve 152 will direct emissions into the channel 166 without switching.

The reducing agent may then be introduced at the low emission temperature reducing agent port 138. When the emission temperature is less than 400° C., the reducing agent may be introduced continuously, in a pulsed fashion, or when introduction is signaled by a sensor and/or a computer model. The continuous introduction should be understood to include introductions that are substantially continuous including high frequency introduction, introductions with modulations in flow, introductions with brief gaps, intended or not, and combinations thereof.

In certain embodiments of the present invention additional reducing agent may be introduced to augment remediation of NOx. As a non-limiting example, when the emissions inlet temperature is less than 400° C., reducing agent may also be introduced at port 142 when the emissions stream 160 is directed to the channel 166. While not wishing to be bound by any particular theory, this introduction of reducing agent at the third port 142 may allow the SCR layer of the layered SCR/LNT 148 to reduce additional NOx.

In certain embodiments of the present invention the valve 116 (FIG. 4*a*) and/or the valve 152 (FIG. 5*a*) may help establish time periods during remediation. As a non-limiting example of a sequence of remediation actions, a remediation sequence may start with the first time segment having a duration independently selected from 1,3,5, or 7 seconds to 8,10, 12, 15, 20, and 30 seconds. During the first time segment, the reducing agent introduction may precondition the SCR. The end of the first time segment, the second time segment begins allowing the introduction of both the exothermic generating agent and reducing agent. The second time segment may have a duration independently selected from 1,3,5, or 7 seconds to 8,10,12, 15, 20, and 30 seconds. After the end of the second time segment, a third time segment begins and has a duration of independently selected from 1,3,5, or 7 seconds to 8,10,12, 15, 20, and 30 seconds during which only the reducing agent is introduced. While not wishing to be bound by any particular theory, this may help to reduce the bleeding of NOx from the downstream end of the NOx trap. After the end of the third time segment, a fourth time segment begins. During the fourth time segment, neither reducing agent nor exotherm generating agent are introduced. The fourth time segment may have a duration independently selected from 15, 20, 25, 30 or 34 seconds to 35,40,50,60, 100, and 297 seconds. A total cycle time of the four-way valve actions described above for certain embodiments of the present invention may comprise the switch period. The length of time periods may vary depending upon the types of SCR and LNT used as well as the engine mathematical models based on the actual engine and emission conditions.

Example 1

This example of the SCR/LNT shows the mitigation of the emissions control problem for mobile sources such as the diesel-powered truck using the method and remediation system of certain embodiments of the present invention.

A relatively difficult control scenario arises when controls try to meter ammonia or urea to match the concentration of NOx during transient engine operations. Transient engine operations may cause the exhaust flow rate, the temperature of the emissions and the NOx concentration to change rapidly. In certain embodiments, to provide relatively high NOx conversion regardless of the concentration of NOx emissions contained in the emissions, the SCR/LNT will make use of its SCR capability, its LNT capability, or both.

Some aspects of this example depend on the exhaust temperature. At the relatively low inlet temperature of emissions, such as in the range of 150 to 400° C., the SCR properties of the SCR/LNT are predominantly being used for remediation by NOx conversion. Relatively high conversions of NOx can be achieved with SCR technology at temperatures as low as 180-200° C. when ammonia is introduced to the emissions. In addition, the SCR layer 40 (FIG. 2) is able to store relatively large quantities of ammonia at these temperatures using its reducing agent storage component. Therefore, the ammonia does not have to be injected at relatively high concentrations into the exhaust to continually match the concentration of NOx from the occasional peak engine emission. If the NOx concentration decreases suddenly, such as during a deceleration transient operation, excess ammonia may be stored in the SCR layer 40. In the converse, if the NOx concentration increases rapidly, such as during an acceleration transient operation, ammonia stored in the SCR layer 40 may supplement the introduced reducing agent to reduce the NOx.

At an intermediate inlet temperature of the emissions 46 (FIG. 2), such as 400-550° C., the ability of the SCR layer 40 to store ammonia may decrease significantly. As a possible result, precisely matching the NOx concentration from the engine with the amount of ammonia injected may present a control problem. As a non-limiting example, during sudden acceleration transient operations, where emissions flow rates and NOx concentrations may increase rapidly, introducing insufficient amounts of $NH_3$ may lead to NOx breakthrough to the emissions outlet 20 (FIG. 1). In the converse, during a sudden deceleration from a high-load condition, the emissions flow rate and NOx concentrations contained in the emissions 46 may decrease rapidly. If the catalyst bed temperature has been previously heated to these intermediate temperatures, the SCR layer 40 may be relatively unable to store effectively any excess $NH_3$. As a consequence, over-introduction of $NH_3$ may lead to $NH_3$ slip emissions to the emissions outlet 20. Further, over-introduction may waste the reducing agent, thereby requiring more frequent and more costly refillings.

Instead of relatively great reliance on the remediation function of the SCR in this intermediate inlet temperature range of emissions, the SCR/LNT may use its NOx storage component of the LNT to store the NOx. While not wishing to be bound by any particular theory, the NOx is probably stored as nitrates in the washcoat.

At relatively high inlet temperature of the emissions 46, such as a range greater than 550° C. to 600° C., the SCR/LNT may still make use of its NOx storage capability to store NOx. The stored NOx may be purged by injecting enough exotherm generating agent into the emissions 46 to produce a net rich A/F ratio.

Example 2

In this example, the LNT portion of the SCR/LNT, either the first LNT 12 (FIG. 2), the LNT layer 34 portion of the layered SCR/LNT 24, and/or the zoned LNT 91 (FIG. 3), may approach its capacity to store NOx. In some cases, the LNT may need to be purged in order to restore the NOx storage capacity. In certain embodiments of the present invention, the LNT may be purged when the exotherm generating agent, such as diesel fuel, is introduced into the emissions 46 (FIG.

2) upstream of the noble metal containing member such as the lightoff catalyst, the first LNT 12 (FIG. 2), the LNT layer 34 (FIG. 2) portion of the layered SCR/LNT 24, and/or the zoned LNT 91 (FIG. 3), while maintaining the overall lean A/F ratio in the emissions stream 46 (FIG. 2). While not wishing to be bound by any particular theory, the fuel may combust to increase the temperature of the emissions 46 which may purge the LNT of stored NOx. The oxidation of the hydrocarbons by the noble metal component may produce the exotherm which may cause the thermal release of NOx that may be stored on the LNT. This purge method may take advantage of the decreasing NOx storage capacity of the lean NOx trap with increasing temperature.

Expensive fuel may be conserved by this method because the fuel may be introduced only as needed in such quantities as needed to increase the emissions 46 (FIG. 2) temperature. The method may avoid using relatively greater quantities of fuel to alter the emissions 46 from the lean A/F ratio to a rich A/F ratio.

A non-limiting example of how this purging method interacts with the integrated SCR/LNT is described. The combined remediation system incorporates several interacting remediation and control methods in order to accommodate the wide ranges of environmental properties in the emissions 46. The emissions 46 are remediated by the introduction of relatively smaller amounts of the reducing agent during all temperature regimes. When the lean NOx trap approaches capacity or the effectiveness of the lean NOx trap decreases, the exotherm generating agent may be introduced to purge the NOx so that it can react with the reducing agent over the SCR portion. The exotherm generating agent, in this example, hydrocarbons, may be injected upstream of the first LNT 12 (FIG. 2) while maintaining an overall lean mixture in the engine and portions of the exhaust system. Ammonia may be introduced into the emissions at approximately the same time as the hydrocarbon introduction. The second introduction port 18 (FIG. 2)from where the ammonia may be introduced may be positioned after the first LNT 12 portion and upstream of the SCR/LNT 24, providing reducing agent to reduce the NOx in the lean mixture when the emissions 46 is exposed to the SCR 40 portion of the SCR/LNT 24.

The introduction of ammonia and/or fuel may only be triggered periodically in this example. Thus, the method may offer advantages in terms of control during transient driving conditions and conservation of expensive fuel.

In a non-limiting example, the introduction may occur during a period when the engine is at a steady-state condition or a semi-steady state condition. The amount of $NO_x$ stored on the LNT can be calculated from lookup tables relating the engine-out $NO_x$ to the speed and load conditions, and therefore the amount of $NH_3$ needed to reduce the $NO_x$ can be determined.

Example 3

In this example, the layered SCR/LNT is made. The LNT layer washcoat can be applied on the honeycombed substrate of mullite with channels open at both ends. The wash coat is dried in place. The LNT is then completed by impregnation of the washcoat with noble metal solutions to yield a product having 150 grams of noble metal, expressed as metal, per cubic foot of dried, washcoated LNT. The SCR washcoat layer is applied over at least portions of the LNT layer washcoat. As part of the washcoating process, the SCR washcoat layer is dried.

Example 4

In this example, the zoned SCR/LNT 92 (FIG. 3) is made. The LNT 96 layer washcoat is applied on the first stainless steel corrugated foil 94 having carbide whiskers and contained within a stainless steel case 98 with channels open at both ends. The wash coat is dried in place. The LNT 91 is then completed by impregnation of the washcoat with noble metal solutions to yield a product having less than 150 grams of noble metal, expressed as metal, per cubic foot of dried, washcoated LNT. The washcoat is then dried.

The SCR 102 layer washcoat is applied on the second stainless steel corrugated foil 104 having carbide whiskers and contained within the second stainless steel case 100 with channels open at both ends. As part of the washcoating process, the layer is dried.

The two separate stainless steel cases are welded together with the LNT 91 located upstream of the SCR 93. The introduction port 108 of the reducing agents may be located near the weld 106 and between the LNT 91 and SCR 93. The introduction port 110 of the exotherm generating agent may be located upstream of the LNT 91. It should be understood that the LNT 91 and SCR 93 need not be adjacent each other. A gap between them may be present without changing the intent of the present invention. Without wishing to be bound by any particular theory, such a gap may facilitate mixing of the reducing agent with the emissions 46 (FIG. 2).

Example 5

This example is drawn to a laboratory reactor design for studying the SCR/LNT. Nitric oxide, $NO_2$, $CO_2$, $O_2$, $N_2$, and $H_2O$ are premixed before passing through the SCR/LNT sample placed in a vertical furnace. Hydrocarbons and/or $NH_3$ can be injected into the feed gas either periodically or continuously using electronically-controlled solenoids valves. Thermocouples are used to measure the inlet and bed temperatures of the SCR/LNT sample. After passing through the sample, the exhaust is diluted 10:1 with $N_2$ to reduce any water concentration and prevent water condensation in unheated sections of the tubing or the gas analyzers. The diluted exhaust is then analyzed for $CO_2$, CO, hydrocarbons, $O_2$, NOx, NO, and $N_2O$. Separate NOx analyzers are used to measure NOx and NO so that the fractions of NO and $NO_2$ can be determined. The analyzers can be calibrated using span gases either as supplied or after the span gas has been diluted 10:1 with $N_2$. A fraction of the diluted exhaust is heated to 600° C. over a platinum catalyst to oxidize $NH_3$ to NO, and this treated exhaust stream can be analyzed with a third NOx analyzer. The difference of this reading and the reading from the other NOx analyzers can provide a measure of the $NH_3$ concentration.

Example 6

This example shows the feasibility of using hydrocarbon oxidation to cause the thermal release of NOx from the LNT. This example also demonstrates that, with the proper formulation, the LNT can be designed to provide maximum NOx storage capacity in the range of temperature independently selected from at least 350° C. and less than 600° C. In this example, the LNT is used to store NOx for 60 seconds. Propylene is injected as the fuel into the feed gas for a period of 15 seconds while maintaining an overall lean A/F ratio. This cycle is repeated continually as the temperature dropped from 550 to 200° C. over a period of approximately two hours. During the non-injection periods, the NOx at the reactor exit is at lower concentration than in the feed gas level.

During the hydrocarbon fuel injection periods, NOx is released from the trap. The reducing agent, ammonia, is injected into the exhaust and then is used to reduce this released NOx over the SCR catalyst.

The average storage efficiency during the last 45 seconds of the 60 second non-introduction periods is a function of temperature for a barium-only formulation and for a formulation containing barium and an alkali metal. Results are shown in Table 1 for 5, 10, and 15-seconds fuel injection periods for a barium plus alkali metal trap provided by a catalyst supplier as well as a 5-second injection period for a barium-only trap. The barium-only formulation provides peak storage efficiency near 300° C., while the barium/alkali metal formulation provided peak storage efficiency closer to 400° C. Also, the barium-only formulation provides relatively high storage efficiency with only 5-second fuel injection periods, while the barium plus alkali metal formulation required up to 15-second fuel injection periods to provide relatively lower storage efficiencies. The barium plus alkali metal formulation has a NOx storage capacity of 46 mg/in$^3$ at its peak temperature of 400° C., while the barium-only formulation has a storage capacity near 29 mg/in$^3$ at its peak temperature of 300° C. It is also relatively easier to thermally purge the trap with lower capacity.

over the SCR with ammonia in the zoned SCR/LNT configuration. The LNT is placed in front of a SCR catalyst. Propylene and ammonia are injected in front of the LNT. However, instead of reducing the NOx during the hydrocarbon injection periods the NOx actually increased. While not wishing to be limited by any one theory, the increase may be due to oxidation of the ammonia over the platinum in the LNT. Placing the ammonia introduction port downstream of the LNT prevents oxidation of the ammonia over the LNT. In a similar manner, placing the hydrocarbon introduction port upstream of the LNT may prevent hydrocarbons from deteriorating the effectiveness of the SCR.

Example 9

This example of certain embodiments of the present invention illustrates a method of using zoned SCR/LNTs in a dual-LNT reversing-flow emission remediation system. A non-limiting example of the dual-LNT reversing-flow emission remediation system is illustrated in FIGS. 4a and 4b. When the NOx storage capacity of the first LNT 120 has been reduced sufficiently to warrant purging of the first LNT 120, the valve 116 is positioned in a second switch position as

TABLE 1

AVERAGE NOx STORAGE EFFICIENCY IN LAST 45-SEC OF 60-SEC CYCLE IN PERCENTAGE AS A FUNCTION OF FUEL INJECTION TIME, LNT FORMULATION, AND BED TEMPERATURE

| AVERAGE BED TEMPERATURE (° C.) | BARIUM-ONLY LNT 5-SEC FUEL PER 60-SEC | BARIUM PLUS ALKALI-METAL LNT 5-SEC FUEL PER 60-SEC | BARIUM PLUS ALKALI-METAL LNT 10-SEC FUEL PER 60-SEC | BARIUM PLUS ALKALI-METAL LNT 15-SEC FUEL PER 60-SEC |
|---|---|---|---|---|
| 200 | 40% | 10% | 14% | 14% |
| 250 | 97% | 25% | 41% | 54% |
| 300 | 100% | 50% | 73% | 79% |
| 350 | 78% | 60% | 78% | 87% |
| 400 | 56% | 63% | 85% | 92% |
| 450 | 37% | 54% | 78% | 83% |
| 500 | 30% | 40% | 58% | 66% |
| 550 | 18% | 28% | 42% | 48% |
| 600 | 5% | 14% | 30% | 36% |

Example 7

This example shows the NOx conversion of a fully-formulated SCR catalyst from a second catalyst supplier. The conversion is measured as a function of temperature using either all NO, a 50/50 mix of NO and NO$_2$, or all NO$_2$. Amonia is injected at approximately 95% of the NOx concentration to prevent NH$_3$ slip. The NOx conversion exceeds 90% at temperatures between 275° C. and 500° C. when using a 50/50 by mass mix of NO and NO$_2$. The conversion obtained when the same mass of only NO$_2$ is introduced is lower than the conversion obtained with same mass of NO or the 50/50 by mass mix of NO and NO$_2$. The conversion with the same concentration of NO$_2$ achieved a maximum of 86% NOx conversion.

Example 8

This example shows and assesses the effect of positioning the introduction ports for reducing and exotherm generating agents when releasing NOx thermally from the LNT with hydrocarbon oxidation and then converting the released NOx illustrated in FIG. 4b. In this example, the valve 116 is an electronically-controlled four-way valve. The switching of the four-way valve initiates four time segments of a remediation sequence which comprise each switching period. The time segments are effective at temperatures above 400° C. During the second switch period, when the first LNT 120 is being purged, a first time segment begins when the reducing agent, in this example, urea, is introduced from the second port 126 upstream of the SCR 128 to precondition the SCR 128. After 5-10 seconds, a second time segment of the remediation sequence begins. During the second time segment, the exotherm generating agent introduction begins while the reducing agent introduction continues. The exotherm generating agent is introduced into the emission at the first port 122. The second time segment is 10 seconds in duration. As the first LNT 120 is exposed to the exotherm generating agent, an exotherm is generated on the front portion of the first LNT 120 and causes NOx to be thermally released from that portion of the first LNT 120. After the second time segment, a third time segment of the remediation sequence begins. During the third time segment, the introduction of the exotherm generating agent ceases, while the reducing agent introduction continues. The third time segment duration is 5-15 seconds. While not wishing to be bound by any particular theory, the continued release of the reducing agent during the third time segment may help to reduce the bleeding of NOx from the downstream end of the NOx trap. After the third time segment, the remediation sequence begins the fourth time segment. During the fourth time segment, the reducing agent introduction ceases. The first LNT 120 is exposed to the emissions stream 112 comprising approximately NOx-free emissions coming from the second LNT 124. Without wishing to be limited by any particular theory, this wait period may allow the exothermic heat generated in the front part of the first LNT 120 to begin to be transported downstream and purge the NOx stored in the rear part of the first LNT 120. After the fourth time segment, the first LNT 120 will be purged and ready to store NOx again. While not wishing to be limited by any particular explanation, the desire that the LNT 120 be exposed to relatively limited amounts of NOx arises from the desire to prevent the adsorption of NOx on to the first LNT 120 during the third and fourth time segments, which may decrease the NOx storage efficiency when the NOx is re-introduced after the next valve switch. The fourth time segment is approximately 45-50 seconds in duration. Combined the duration of the first, second, third, and fourth time segments of the remediation sequence comprise the duration of the second switch period, which is 60 seconds.

The first switch period begins when the four-way valve switches to the first switch position illustrated in FIG. 4a. With the four way valve in this position, each of the four time segments are repeated again. The first switch period is 60 seconds and ends when the four-way valve switches back to the second switch position.

Example 10

This example of certain embodiments of the present invention illustrates using layered SCR/LNTs in a dual-LNT reversing-flow emission remediation system. The switch periods and time segments of this Example may be similar to the switch periods and time segments of Example 9. A non-limiting example of the dual-LNT reversing-flow emission remediation system having the first and second SCRs being layered SCR/LNTs is illustrated in FIGS. 5a and 5b. When the NOx storage capacity of the first LNT 146 has been reduced sufficiently to warrant purging of the first LNT 146, the valve 152 is positioned in a second switch position as illustrated in FIG. 5b. In this example, the valve 152 is an electronically-controlled four-way valve. The four-way valve yields four time segments which comprise each switching period. The time segments are effective at temperatures above 400° C. During the second switch period for purging the first LNT 146, a first time segment begins when the reducing agent, in this example, urea, is introduced from the second port 140 upstream of the SCR 144 to precondition the SCR 144. After 5-10 seconds, a second time segment of the valve begins. During the second time segment, the exotherm generating agent introduction begins at first port 170 while the reducing agent introduction continues. The second time segment is 10 seconds in duration. As the first LNT 146 and the LNT layer of the first SCR 144 are exposed to the exotherm generating agent, an exotherm is generated on the front portion of the first LNT 146 and the LNT portion of the first SCR 144 and causes NOx to be thermally released from that portion of the first LNT 146 and the first SCR 144. After the second time segment, a third time segment of the valve 152 begins. During the third time segment, the introduction of the exotherm generating agent ceases, while the reducing agent introduction continues. The third time segment duration is 5-15 seconds. While not wishing to be bound by any particular theory, the continued release of the reducing agent during the third time segment may help to reduce the bleeding of NOx from the downstream end of the NOx trap. After the third time segment, the valve 152 begins the fourth time segment. During the fourth time segment, the reducing agent introduction ceases or is gradually diminished to match the concentration of NOx released from the first LNT 146 and/or the LNT layer of the SCR 144. The first LNT 146 and the LNT layer of the SCR 144 is exposed to the emissions stream 160 comprising approximately NOx-free emissions coming from the second LNT 150. Without wishing to be limited by any particular theory, these illustrated third and fourth time segments may allow the exothermic heat generated in the front part of the LNT 146 to be transported downstream and purge the NOx stored in the rear part of the first LNT 146. After the fourth time segment, the first LNT 146 will be purged and ready to store NOx again. While not wishing to be limited by any particular explanation, the desire that the first LNT 146 be exposed to relatively limited amounts of NOx arises from the desire to prevent the adsorption of NOx on to the first LNT 146 or the LNT layer of the SCR 144 during the third and fourth time segments, which may decrease the NOx storage efficiency when the NOx is re-introduced during the second switch period. The fourth time segment is approximately 45-50 seconds in duration. Combined the duration of the first, second, third, and fourth time segments comprise the duration of the second switch period, which is 60 seconds.

The first switch period begins when the valve 152 switches to the first switch position illustrated in FIG. 5a. With the valve 152 in this position, each of the four time segments are repeated again. The first switch period is 60 seconds and ends when the valve 152 switches back to the second switch position.

It should be understood that while a layered SCR/LNT is used in this example for the first SCR 144 and the second SCR 148, the first SCR 144 and the second SCR 148 could also be a zoned SCR or a combination zoned and layered SCR/LNT.

After approximately 60 seconds, approximately when the NOx storage capacity of the second LNT 150 has been reduced sufficiently to warrant purging of the second LNT 150, the valve 152 switches back to a position illustrated in FIG. 5a. The emission flow 160 switches back to the channel 166. In this positioning, the exhaust flows over the first SCR 144 and the first LNT 146 passing the first port 170 to expose the second LNT 150 and the LNT layer of the second SCR 148, which are positioned in the channel 168. The exotherm generating agent, in this non-limiting example, hydrocarbons, are introduced to the emissions from the first port 170. The hydrocarbons are oxidized on the second LNT 150 positioned in the channel 168, releasing NOx from the second LNT 150 and from the second SCR 148. Ammonia, a non-limiting example of the reducing agent, can be introduced at the third port 142 positioned between the second LNT 150 and the second layered SCR/LNT 148 relatively simultaneously with the introduction of hydrocarbon.

After approximately 60 seconds, approximately when the NOx storage capacity of the first LNT 146 and the LNT layer of the first SCR 144 have been reduced sufficiently to warrant purging of the first LNT 146, the valve 152 switches back to a position illustrated in FIG. 5*b*; and the remediation and purging processes repeat.

Example 11

This example of certain embodiments of the present invention illustrates options for methods of remediation when operating at temperatures below 400° C. The remediation system of Example 10 may cease to the introduction of hydrocarbons from the first port 170. The valve 152 is switched to flow emissions into the channel 166 as shown in FIG. 5*a*. Ammonia or other reducing agent can be introduced continuously at the third port 142 positioned relatively upstream, in certain embodiments, of the second SCR 148 to reduce the NOx over the SCR layer. In addition, ammonia or other reducing agent may optionally be introduced continuously at the low emission temperature reducing agent port 138.

While the best mode for carrying out the invention has been described in detail, those familiar with the art to which this invention relates will recognize various alternative designs and embodiments for practicing the invention.

What is claimed:

1. A method of remediating emissions comprising:
    exposing a stream of NOx emission from the combustion of an air/fuel mixture having an air/fuel ratio $\geq 15$ to a first lean NOx trap;
    introducing an exotherm generating agent to the stream downstream of the first LNT;
    exposing the stream to a second LNT including adsorbed NOx;
    introducing a reducing agent to the stream downstream of the second LNT; and
    exposing the stream to an SCR catalyst.

2. A method for remediating an emission containing NOx emissions using a selective catalytic reduction catalyst and lean NOx traps, the method comprising:
    (a) exposing a stream of emissions resulting from the combustion of an air/fuel mixture having an air/fuel ratio of greater than or equal to 15 to a first lean NOx trap;
    (b) introducing an exotherm generating agent to the emission stream downstream of the first LNT;
    (c) exposing the emission stream to a second LNT including adsorbed NOx;
    (d) introducing a reducing agent to the emission stream downstream of the second LNT;
    (e) exposing the emission stream to a first SCR; and
    (f) producing a remediated emission.

3. The method of claim 2, further comprising ceasing introduction of the exotherm generating agent when the emissions inlet temperature is less than 400° C.

4. The method of claim 2, further comprising introduction of a NOx-free emission to the second LNT during the fourth time segment.

5. The method of claim 2, further comprising introducing the reducing agent at a low emission temperature reducing agent port when the emissions inlet temperature is less than 400° C.

6. The method of claim 5, wherein introducing the reducing agent occurs substantially continuously.

7. The method of claim 2, further comprising:
    (g) using a valve to direct the emission stream to the first LNT;
    (h) initiating a remediation sequence;
    (i) waiting a first switching period;
    (j) using the valve to direct the emission stream to the second LNT;
    (k) initiating the remediation sequence; and
    (l) waiting a second switching period.

8. The method of claim 7, wherein the second switching period is sufficient to purge effective amounts of NOx from the first LNT.

9. The method of claim 7, wherein the second switching period is about 10-300 seconds.

10. The method of claim 7, wherein the second switching period is about 50-70 seconds.

11. The method of claim 7, wherein the valve is a four-way valve.

12. The method of claim 7, wherein initiating the remediation sequence further comprises:
    (m) introducing the reducing agent during a first time segment;
    (n) introducing the exothermic generating agent and the reducing agent during a second time segment;
    (o) introducing the reducing agent during a third time segment; and
    (p) waiting during a fourth time segment.

13. The method of claim 12, wherein the first time segment is about 5-10 seconds.

14. The method of claim 12, wherein the second time segment is about 5-10 seconds.

15. The method of claim 12, wherein the third time segment is about 5-15 seconds.

16. The method of claim 12, wherein the fourth time segment is about 25-40 seconds.

* * * * *